April 16, 1940.    W. B. PIPER ET AL    2,197,650
TOOL FOR TENDERING MEAT AND FOR LIKE PURPOSES
Filed April 20, 1939
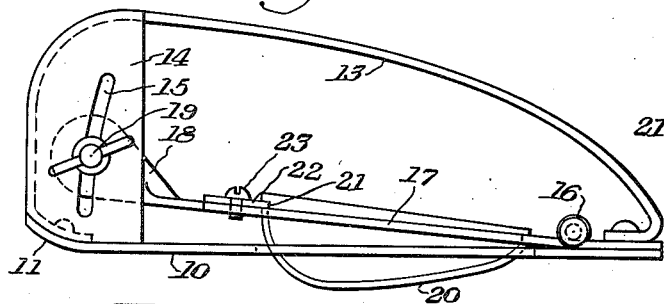
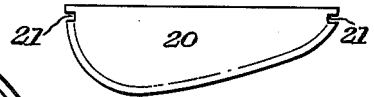
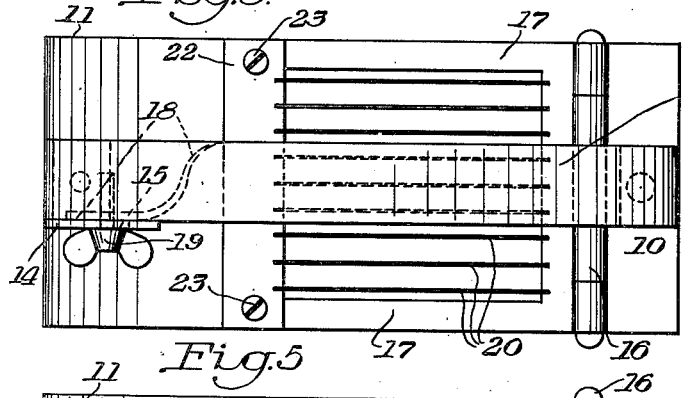
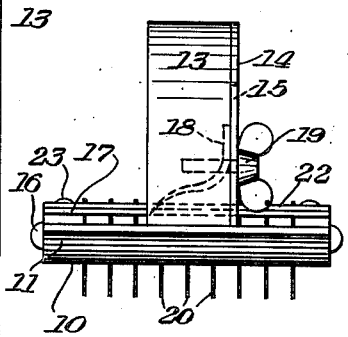
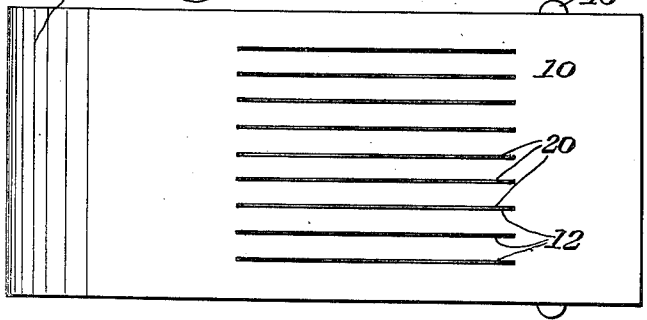
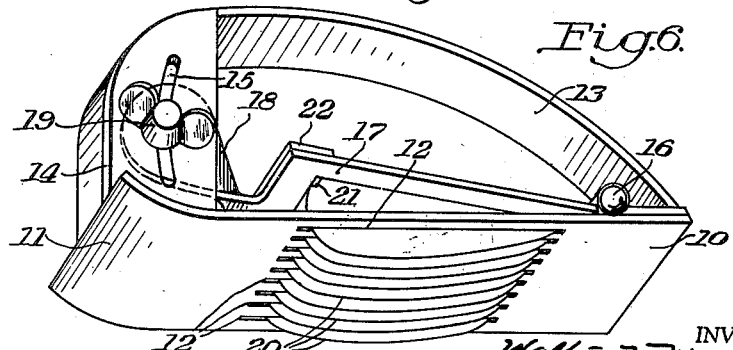

UNITED STATES PATENT OFFICE 2,197,650

TOOL FOR TENDERING MEAT AND FOR LIKE PURPOSES

Walter B. Piper and Harry G. Kuhns, Lilly, Pa.

Application April 20, 1939, Serial No. 268,926

2 Claims. (Cl. 30—304)

In the treatment of meat it is common practice to cut or score the surfaces of the same, previous to cooking, to render the meat tender. Again the surfaces of hams are frequently scored or cross-hatched to give the cooked ham an ornamental appearance. It is likewise common practice to cut or score the surfaces of a mass of dough such as the surfaces of pies, buns, biscuits and the like, before baking. Again rolled or flattened dough for noodles and the like are cut into strips.

Our principal object is to provide a cheap, durable and convenient tool for tendering meat, provided with one or a plurality of cutting edges and with practical means for adjusting the depth to which the cuts are made.

Another object in view is the provision of such a tool which also may be used for the other purposes above mentioned, and for other like purposes.

In the accompanying drawing, wherein we have illustrated a practical embodiment of the principles of our invention, Fig. 1 is a side elevation of the tool;

Fig. 2 is an elevation on reduced scale of one of the cutting blades;

Fig. 3 is a top plan view of the tool shown in Fig. 1;

Fig. 4 is an end view of the same looking left in Figs. 1 and 3;

Fig. 5 is a bottom plan view of the same.

Fig. 6 is a perspective of the tool.

Referring more particularly to the drawing, 10 represents a flat metal base plate of greater length than width and slightly curved upwardly at one end as shown at 11.

Intermediate of its length the plate is provided with a plurality of longitudinally slotted openings 12.

13 represents an upwardly arched handle whose ends are inturned and riveted or otherwise attached to the upper surface of the plate 10 at either end of the latter. 14 represents a vertical web preferably integral with the handle and provided with a curved slotted opening 15 which is concentric with the hinge 16 which is adjacent the other end of the plate 10.

17 represents a rectangular open frame which at one end is pivotally connected on a horizontal axis to the upper surface of the plate 10 and its other end is provided with a tongue 18, preferably formed by twisting the metal so that it rides flat against the inner vertical face of the web 14 of the handle 13. The tongue 18 is pierced by a threaded hole which registers with the slot 15. 19 is a bolt, having a winged head to be grasped by the fingers. The bolt extends through the slot 15 and screws into the threaded hole in the tongue 18. Thus by loosening the bolt 19 the frame 17 may be swung up or down on its hinge, and by tightening the bolt the frame may be held rigidly in any adjusted position relatvie to the base plate 10.

20 represents a plurality of steel cutting blades removably mounted in parallelism in the opening of the frame 17, and each vertically aligned with one of the slots 12 of the base plate 10.

When the frame 17 is elevated to its highest position, regulated by the length of the slot 15, the blades are withdrawn relative to the base plate so that their cutting edges are no longer exposed at the under surface of said plate, so that the tool may be laid aside or shipped without danger of scoring or cutting adjacent objects or surfaces.

By adjusting the angular relation of the frame 17 to the base plate 10, the cutting blades may be adjusted to protrude below the under surface of the base plate to any desired degree, the limit of the protrusion being determined, of course, by the length of the slot 15. By tightening the bolt the frame may be held to maintain the desired protrusion of the blades.

The cutting edges of the blades are preferably curved substantially as shown and the sharpened edges turn upwardly at the ends so as not to be exposed when the frame is in a lower position, thus preventing the ends of the cutting edges from gouging or making a rough surface cut in the substance being scored or sliced.

Any convenient method of detachably mounting the blades in the open frame 14 may be employed.

Thus we have shown the ends of the blades, adjacent their top edge, provided with notches 21. At one end, the right in Figs. 1 and 3, the end edge of the opening of the frame is engaged or received by these notches, while the notches at the other end of the blades are engaged by a bar 22 which rests on the frame 17 adjacent and overlapping the other end of the opening, and is secured to the frame as by set screws 23.

Thus by removing the screws and the plate the blades may be readily removed from the frame. Again by first engaging the notches at one end of the blades with the end of the opening, then engaging the bar with the notches at the other end of the blades, and then attaching the bar to the frame, the blades may be quickly mounted in position.

We believe that the utility of the above described tool is self-evident. Meat or other food substances may be scored or cut to any desired depth, either in one direction or in a crosshatched or diced manner, and dough or other food products, such for instance as vegetables may be cut into squares or other sections.

The tool is simple in structure, thus being inexpensive to manufacture, and not subject to undue wear or danger of breakage.

We claim:

1. In a tool of the character described, the combination of a base plate provided with parallel slotted openings extending longitudinally of the base plate, a handle disposed longitudinally of the plate and spaced upwardly therefrom, means for connecting the ends of the handle to the ends of the base plate, a frame disposed between the base plate and the handle and pivotally connected at one of its ends to the base plate, a plurality of cutting blades mounted on the frame and arranged to protrude downwardly through the slotted openings in the base plate, the extent of protrusion of the blades below the base plate being regulated by the adjustment of the angular relation of the frame to the base plate, and means for interengaging the frame and the base plate and handle structure for positively fixing the frame against movement from its adjusted position relative to the base plate.

2. In a tool of the character described, the combination of a base plate provided with parallel slotted openings extending longitudinally of the base plate, a handle disposed longitudinally of the plate and spaced upwardly therefrom, means for connecting the ends of the handle to the ends of the base plate, a frame disposed between the base plate and the handle and pivotally connected at one of its ends to the base plate, a plurality of cutting blades mounted on the frame and arranged to protrude downwardly through the slotted openings in the base plate, the extent of protrusion of the blades below the base plate being regulated by the adjustment of the angular relation of the frame to the base plate, a wall portion fixed relative to the base plate and provided with an arcuate opening concentric with the pivotal axis of the frame, and a bolt carried by the frame and extending through the opening to positively fix the frame in the desired angular relation to the base plate.

WALTER B. PIPER.
HARRY G. KUHNS.